US007625288B1

(12) United States Patent
Steelman

(10) Patent No.: US 7,625,288 B1
(45) Date of Patent: Dec. 1, 2009

(54) ERGONOMIC GAMING MACHINE

(75) Inventor: Paul C. Steelman, Las Vegas, NV (US)

(73) Assignee: Steelman Gaming Technology, Las Vegas, NV (US)

( * ) Notice: Subject to any disclaimer, the term of this patent is extended or adjusted under 35 U.S.C. 154(b) by 328 days.

(21) Appl. No.: 11/127,840

(22) Filed: May 11, 2005

Related U.S. Application Data

(63) Continuation of application No. 09/967,899, filed on Sep. 28, 2001, now Pat. No. 6,910,734, which is a continuation-in-part of application No. 09/678,853, filed on Oct. 4, 2000, now abandoned.

(51) Int. Cl.
*A63F 13/00* (2006.01)

(52) U.S. Cl. .......................................... 463/46; 463/20

(58) Field of Classification Search .................. 463/46, 463/20; 273/309; 312/234, 237
See application file for complete search history.

(56) References Cited

U.S. PATENT DOCUMENTS

| | | | | |
|---|---|---|---|---|
| 2,661,954 | A | 12/1953 | Koci | |
| 3,077,038 | A | 2/1963 | Williams et al | |
| 3,338,193 | A | 8/1967 | Beck et al | |
| 4,657,257 | A | 4/1987 | Lubeck | 463/47 |
| 4,880,270 | A | 11/1989 | Cooper | |
| 5,056,864 | A | 10/1991 | Cooper | 297/188 |
| 5,113,990 | A * | 5/1992 | Gabrius et al. | 194/206 |
| 5,177,616 | A | 1/1993 | Riday | |
| 5,457,306 | A * | 10/1995 | Lucero | 235/380 |
| 5,597,163 | A * | 1/1997 | Takemoto et al. | 273/309 |
| 5,779,305 | A | 7/1998 | Hocking | |
| 5,807,177 | A | 9/1998 | Takemoto et al. | 463/47 |
| 5,826,882 | A * | 10/1998 | Ward | 273/309 |
| 5,927,815 | A | 7/1999 | Nakamura et al. | 297/411.38 |
| 5,938,282 | A | 8/1999 | Epple | |
| 5,967,599 | A | 10/1999 | Cauffiel | 297/135 |
| 6,016,385 | A | 1/2000 | Yee et al. | 700/245 |
| 6,092,868 | A | 7/2000 | Wynn | 297/146 |
| 6,102,476 | A | 8/2000 | May et al. | 297/217 |
| 6,116,597 | A | 9/2000 | Rowe et al. | 273/143 R |
| 6,145,926 | A | 11/2000 | Lin | 297/217 |
| 6,375,259 | B1 | 4/2002 | Ma | |
| 6,422,670 | B1 * | 7/2002 | Hedrick et al. | 312/223.1 |
| 6,530,842 | B1 | 3/2003 | Wells et al. | |
| 6,620,047 | B1 * | 9/2003 | Alcorn et al. | 463/37 |
| 2003/0045353 | A1 * | 3/2003 | Paulsen et al. | 463/40 |
| 2004/0137978 | A1 * | 7/2004 | Cole et al. | 463/16 |

* cited by examiner

*Primary Examiner*—Milton Nelson, Jr.
(74) *Attorney, Agent, or Firm*—Jeffer Mangels Butler & Marmaro LLP

(57) ABSTRACT

A gaming machine comprising a seat, a main body portion that includes the seat, an arm pivotally connected to the main body portion, and a user interface attached to the arm and pivotal with respect to the seat, wherein the user interface is operable for gaming. In a preferred embodiment the seat and main body portion comprise an upholstered lounge chair and the user interface pivots in a generally vertical arc between first and second positions.

1 Claim, 10 Drawing Sheets

ERGONOMIC GAMING MACHINE

This is a continuation-in-part of application Ser. No. 09/678,853, filed Oct. 4, 2000, the entirety of which is incorporated herein by reference and is related to Method and System For Operating a Gaming Device Offering Non-Gaming Services, filed on Sep. 28, 2001 the entirety of which is incorporated herein by reference.

FIELD OF THE INVENTION

The present invention relates to the field of gaming machines and more specifically to ergonomic gaming machines.

BACKGROUND OF THE INVENTION

The gaming industry is always looking for new ways to entice users to play its games. Slot machines are a very popular form of gaming. Current slot machines typically only include one game and except only a single monetary unit, such as nickels or quarters. Because many slot machines only include one game, the machines and chairs take up floor space on a game by game basis and are costly for casinos as multiple machines must be purchased for multiple games. Also, current slot machines are uncomfortable to sit at for extended periods of time due to the use of stools that often do not have backs.

When gaming, a patron often desires food or drinks. Currently, the patron must get the attention of a cocktail waitress to order food or drinks. This can be bothersome to the patron and it can often take a long period of time to find the waitress. One prior art attempt to solve this need involves a switch with a light on top of the machine to attract the waitress. However, this still takes time for the waitress to spot the light.

Also, people like to talk and socialize while gaming, but current arrays of slots do not readily allow for this.

Accordingly, a long felt need exists for a gaming machine that overcomes the disadvantages described above.

SUMMARY OF THE PREFERRED EMBODIMENTS

In accordance with a first aspect of the present invention there is provided a gaming device that includes a module for holding a gaming device, a human support surface connected to the module, and a transport and positioning device for positioning the user interactive surface in operational contact with the user. The module has a user interactive surface.

In accordance with another aspect of the present invention there is provided a gaming machine that includes a human support surface, a main body portion that includes the human support surface, an arm pivotally connected to said main body portion, and a user interface attached to the arm and pivotal with respect to the human support surface. The user interface is used for gaming. In a preferred embodiment, the arm is in mechanical communication with a counterweight assembly and the user interface is pivotal between a first position and a second position.

In accordance with another aspect of the present invention there is provided a gaming machine that includes a chair having a seat and a back, and a movable user interface associated with the chair.

In accordance with yet another aspect of the present invention there is provided a method of gambling. The method includes the steps of sitting on a seat, pivoting a user interface from a first position to a second position, and gambling using the user interface. Preferably, the user interface is attached to an arm and the arm is pivotally connected at an opposite end to the seat and the arm can be pivoted in a generally vertical arc.

In accordance with yet another aspect of the present invention there is provided a gaming machine layout that includes a first gaming machine and a second gaming machine angled toward one another so that users of each machine can socialize. Each gaming machine includes a chair having a seat and a back, and a movable gaming device associated with the chair.

In accordance with yet another aspect of the present invention there is provided a gaming machine comprising, a bottom portion, an intermediate portion extending upwardly from the bottom portion, two desks extending from the intermediate portion in opposite directions, two display housings extending upwardly from the intermediate portion, and a tower affixed to one of the sides of the intermediate portion. The tower includes at least two bill acceptors. The intermediate portion houses at least two central processing units, and has opposite sides. The desk includes at least one ticket printer in electrical communication with the one or more processors. The display housings each house a touch screen display in electrical communication with one of the central processing units.

A need exists for a gaming machine that has the following advantages, among others, multiple games and multiple monetary units; a comfortable seat; a reduced need for floor space, allowing for more units in the same space; reduced cost; and the ability to order food or drinks using the gaming machine. The above referenced aspects of the present invention address these needs.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
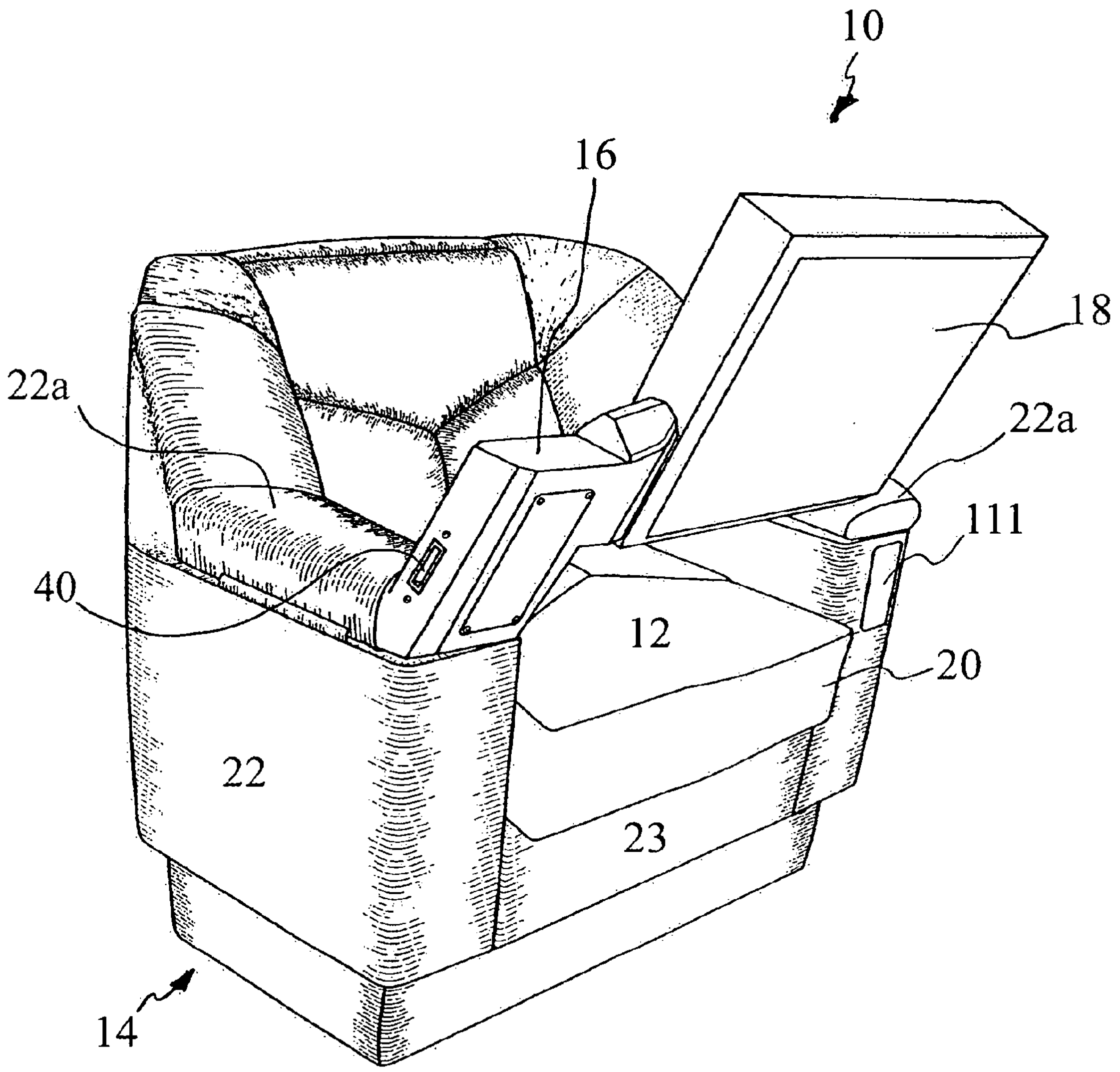
FIG. 1 is a perspective view of a seated gaming machine in accordance with a first embodiment of the present invention.
Figure 2:
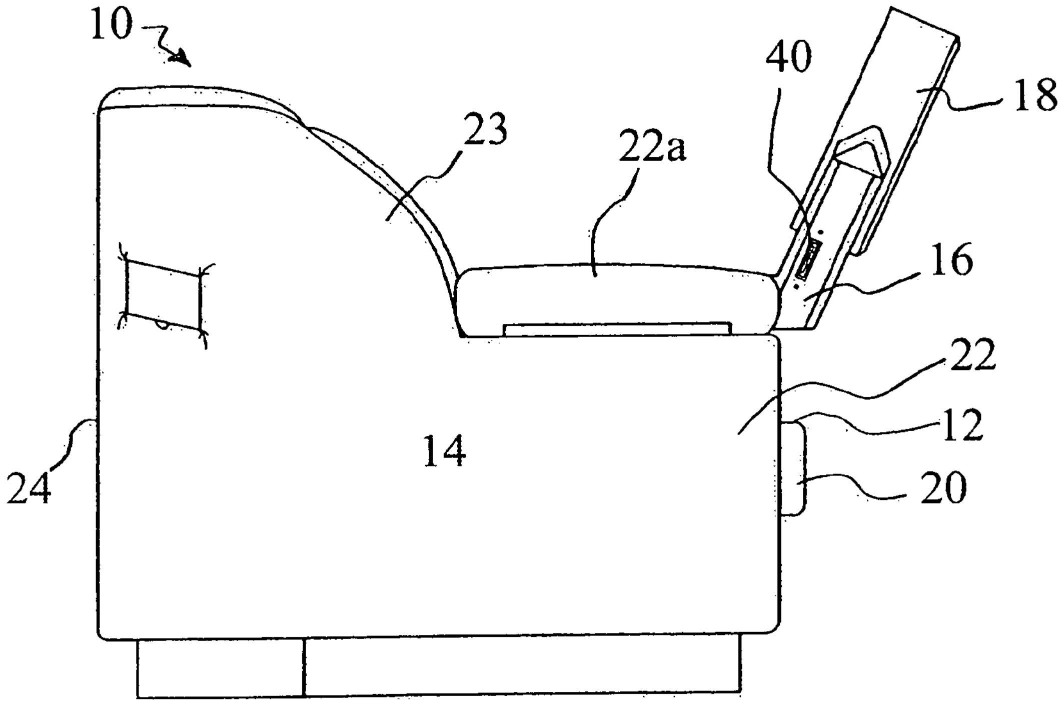
FIG. 2 is a side elevational view of the seated gaming machine of FIG. 1.

With reference to FIGS. 1-7, the present invention provides for a seated gaming machine 10. The machine includes a seat 12, a main body portion 14, swing arm 16 and a display panel/user interface 18. It will be appreciated that terms such as "left," "right," "top," "bottom," "inwardly," "outwardly," "front," "inner," "up," and "down" and other positionally descriptive terms used hereinbelow are used merely for ease of description and refer to the orientation of the components as shown in the Figures. It should be understood that any orientation of the elements described herein is within the scope of the present invention.

Figure 3:
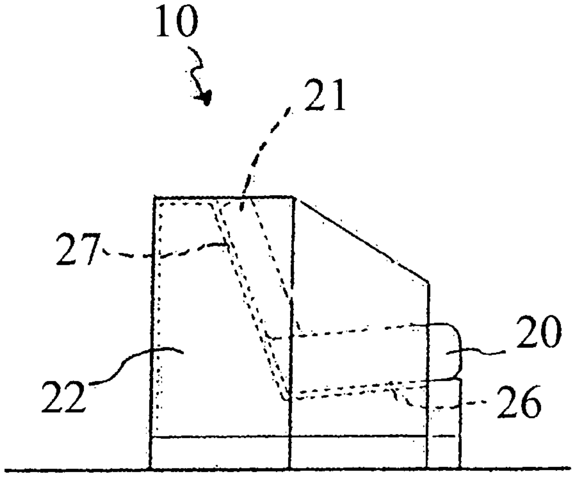
FIG. 3 is a side elevational view of the seated gaming machine of FIG. 1 with the swing arm removed and the cushions shown in phantom.
Figure 4:
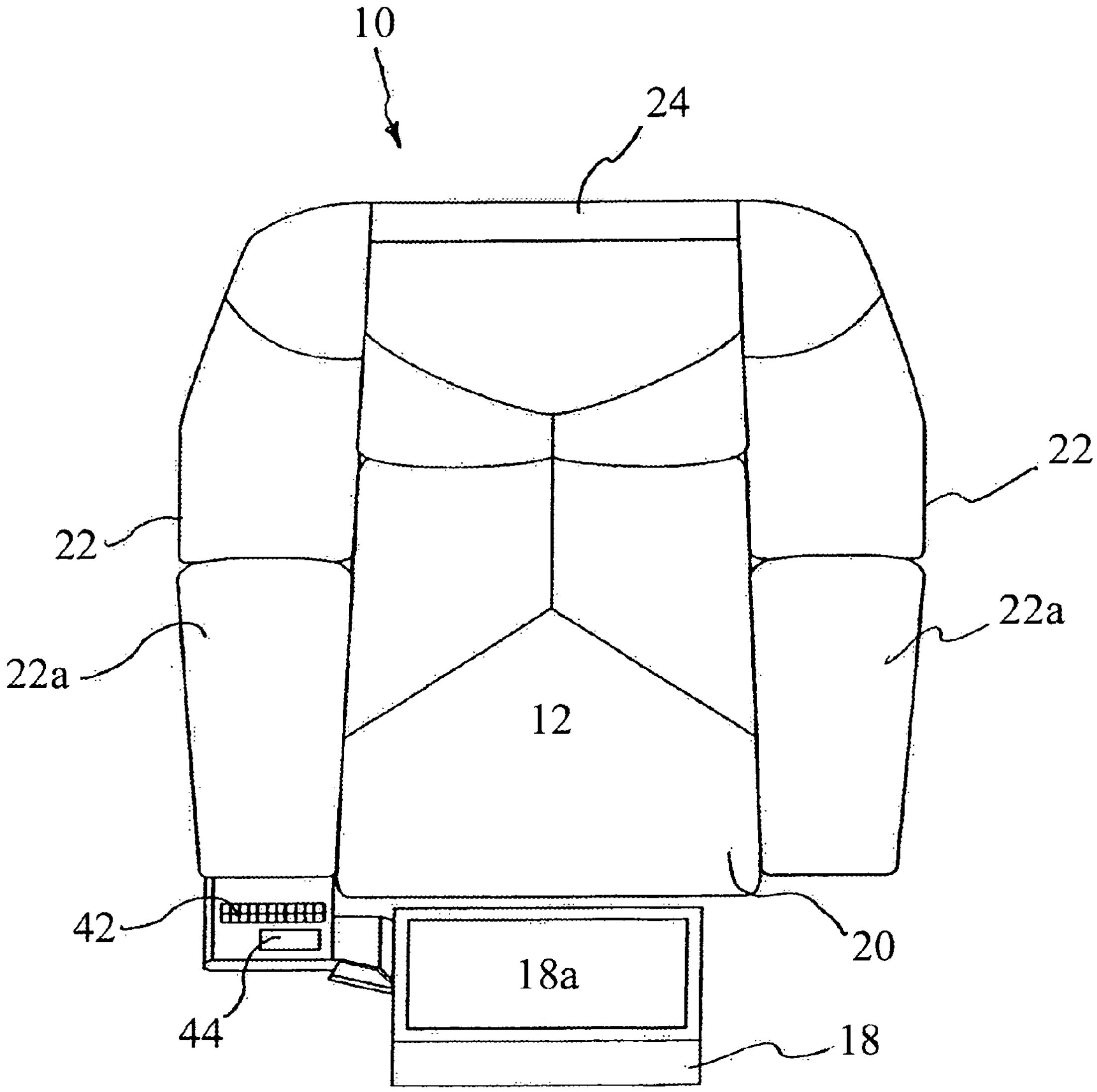
FIG. 4 is a top plan view of the seated gaming machine of FIG. 1.
Figure 5:
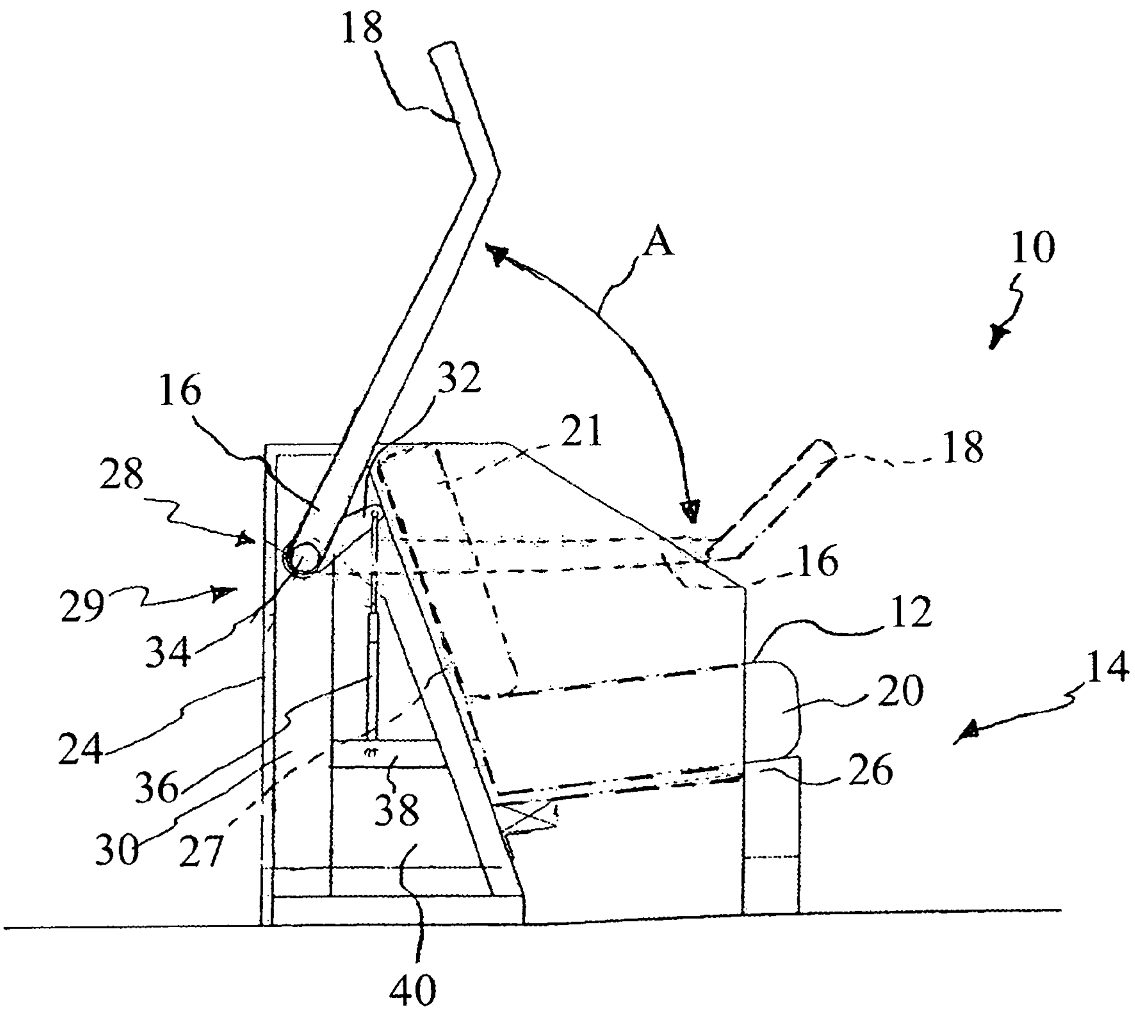
FIG. 5 is a side elevational view of the seated gaming machine of FIG. 1 with a portion of the side cut away to show the counterweight assembly.
Figure 6:
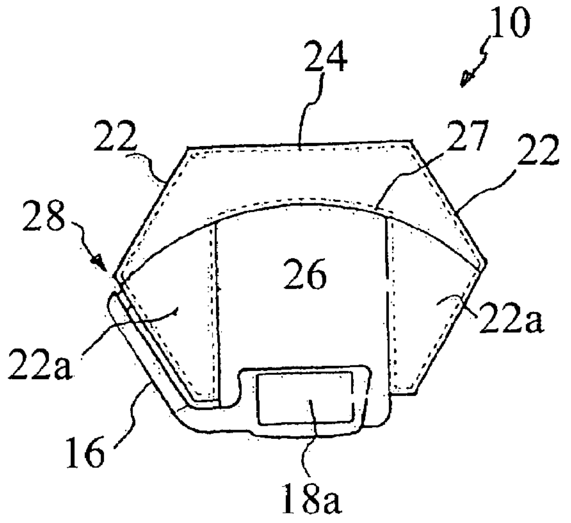
FIG. 6 is a top plan view of the seated gaming machine of FIG. 1 with the cushions removed.
Figure 7:
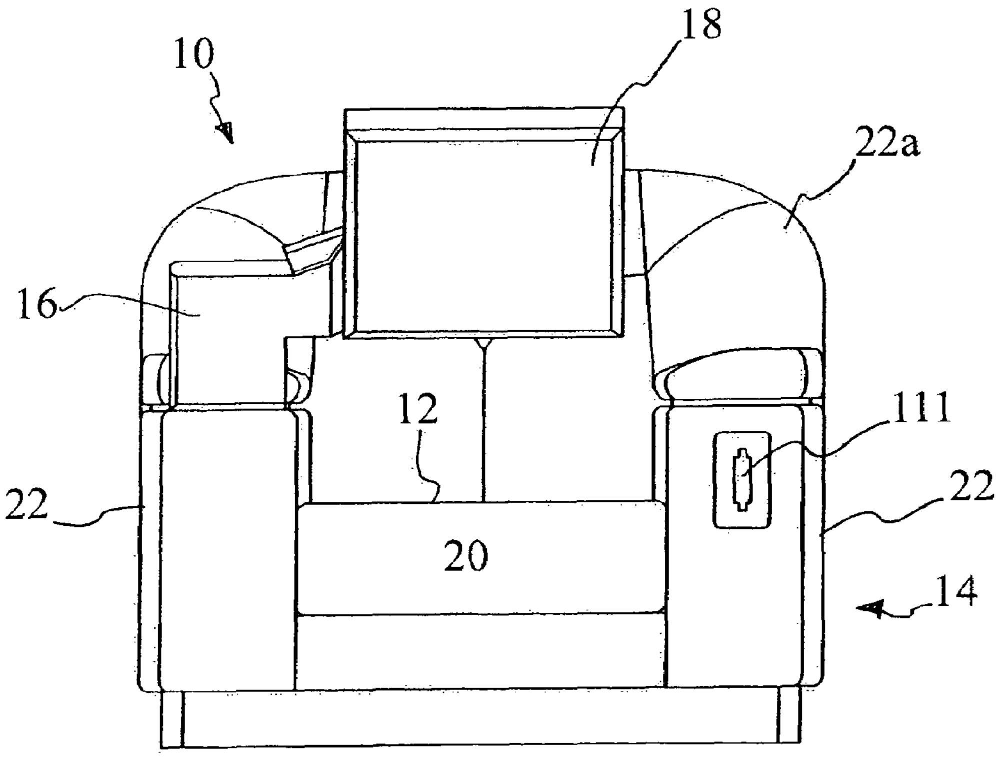
FIG. 7 front elevational view of the seated gaming machine of FIG. 1.

As best shown in FIG. 1, the seat 12 and main body portion 14 preferably comprise a lounge-type chair. The type of lounge chair is not a limitation on the present invention. For example, the lounge chair may include cushions (such as seat cushion 20 and back cushion 21), as shown in FIGS. 3, 5, and 6, or the entire chair may be upholstered with cushioning material under the upholstery 23 (such as leather), or a combination of both as shown in FIGS. 1, 2, 4 and 7. However, it will be understood that the seat 12 can be any seat or surface that supports a person (human support surface) known in the art, e.g., a cushioned chair, a non-cushioned chair, a stool, a bed, a dentist's-type chair, a futon, an exercise bicycle, a treadmill etc. The type of seat is not intended to be a limitation on the broadest aspects of the present invention.

The main body portion 14 includes two side portions 22 (each having an arm 22*a*) and a back 24. In a preferred embodiment, the main body portion 14 includes supports, such as a set of legs or pads intended to contact the floor. A seat support 26 and a back support 27 extend between the two side portions 22 as shown in FIG. 6. Preferably, the bottom cushion 20 rests on the seat support 26 and the back cushion 21 rests against the back support 27 and on the bottom cushion 20. The cushions are intended to provide comfort to a user of the machine 10. It will be understood that different portions of the chair can have cushions thereon. For example, the arms 22*a* or side portions 22 can include cushions or cushioning material. In a preferred embodiment, the entire chair is upholstered.

The swing arm 16 is pivotally connected to the main body portion 14 by a joint assembly 28 and can extend through an opening in one of the sides 22, as shown in FIG. 5. However, swing arm 16 can also extend out of one of the arms 22*a*, as shown in FIG. 1. The swing arm 16 is preferably pivotal in a vertical arc A (as shown in FIG. 5), such that it can be raised out of the way to allow a user to sit on the seat 12. The out of the way position will be referred to herein as the first position. Once the user is seated, the swing arm 16 is lowered and positioned just above the lap of the user. The gaming position will be referred to herein as the second position. The swing arm 16 is mechanically controlled by pivots and stabilizers to move the swing arm 16 in a predetermined path of travel, having the first and second positions at the ends of this path.

In a preferred embodiment, the swing arm 16 includes a counterweight assembly 29 that reduces the effort necessary by a user for pivoting the swing arm 16 from the first position to the second position, and vice versa. Preferably, the counterweight assembly 29 includes cam operated gas shocks as found in automotive applications such as hood struts or hatchback struts. The struts push against a predetermined weight (determined by the gas pressure within the struts) thereby countering the weight of the arm 16 and causing the weight to be almost neutral. The apparent weight of the arm is minimized, thereby requiring very little effort by the user in raising or lowering the swing arm 16.

An example of the counterweight assembly 29 is shown in FIG. 5. Preferably, the back 24 has a support frame 30 connected thereto, to which the counterweight assembly 29 is anchored. As shown, the arm 16 is pivotally connected to a cam 32 by a bearing or bearings 34 and ultimately to the support frame 30. The support frame 30 can be a steel angle or the like. The cam 32 is pivotally connected at its opposite end to a strut 36 (preferably a gas strut), which is anchored to a cross brace 38 in the back of the main body portion 14 of the chair. It will be understood that the strut 36 can also be anchored to other components of the main body portion 14. In FIG. 5, the cam 32 and strut 36 are shown in solid lines in the first position (the raised position of the arm 16). In this position, the strut 36 is in its fully extended position. In FIG. 5, the cam 32 and strut 36 are shown in phantom lines in the second position (the lowered or gaming position of the arm 16). In this position, the strut 36 is in its fully compressed position.

In another embodiment the swing arm 16 can be pivotal in a horizontal arc. It will be understood that the purpose of the swing arm 16 being pivotal is to move the display panel/user interface 18 out of the way so that a user can sit down. Accordingly, it is within the scope of the present invention to provide any type of user interface (monitor, touch screen display or the like) movable between a first position and a second position.

In another embodiment, the display panel/user interface 18 may be mounted on an electronically activated track or may swing out of the arm of the chair similar to an eating tray on an airplane seat. Any transport and positioning device for bringing the display panel/user interface 18 into operational contact with the user is within the scope of the present invention.

The display panel/user interface 18 houses at least one touch screen display 18*a* for the user to reach and select from a menu of services. The services include, but are not limited to playing games, ordering food or drinks, and checking out of the casino, as well as other functions as described in Ser. No. 09/967,861, titled Method and System For Operating a Gaming Device Offering Non-Gaming Services. The display 18*a* is preferably connected to a computer network. In an alternative embodiment the computer can be housed within the main body portion 14, thereby forming a stand alone unit. For example, the computer can be housed in space 40, as shown in FIG. 5. The display panel/user interface 18 is preferably disposed at the end of swing arm 16.

In an alternative embodiment of the invention the arm 16 and display panel/user interface 18 may be fixed and mounted in a position such that a user can slide by the display panel/user interface 18 to sit in the seat 12. Also, the arm 16 or display panel/user interface 18 can include inputs 40 for peripherals (such as a printer or the like), a keyboard 42, a mouse or other pointing device 44 and a ticket printer 111, as described below.

In a preferred embodiment the chair is used for gaming purposes. However, the description herein is only intended to be exemplary and not a limitation on the broadest aspects of the present invention. In other embodiments, the chair can be used for educational purposes (such as in schools), home computing, race/sports books, Internet cafes or other places where Internet access is desirable.

As described above, the broad invention is a physical user interface for gaming in which a person is supported on a seat or other surface for supporting a person while gaming via a user interface. The seat 12 does not necessarily have to be attached to the display housing/user interface 18. For example, the display panel/user interface 18 can be mounted on a wall (either fixedly or pivotally), and the seat 12 can be a separate chair or the like that is adjacent the display panel/user interface 18.

Figure 8:
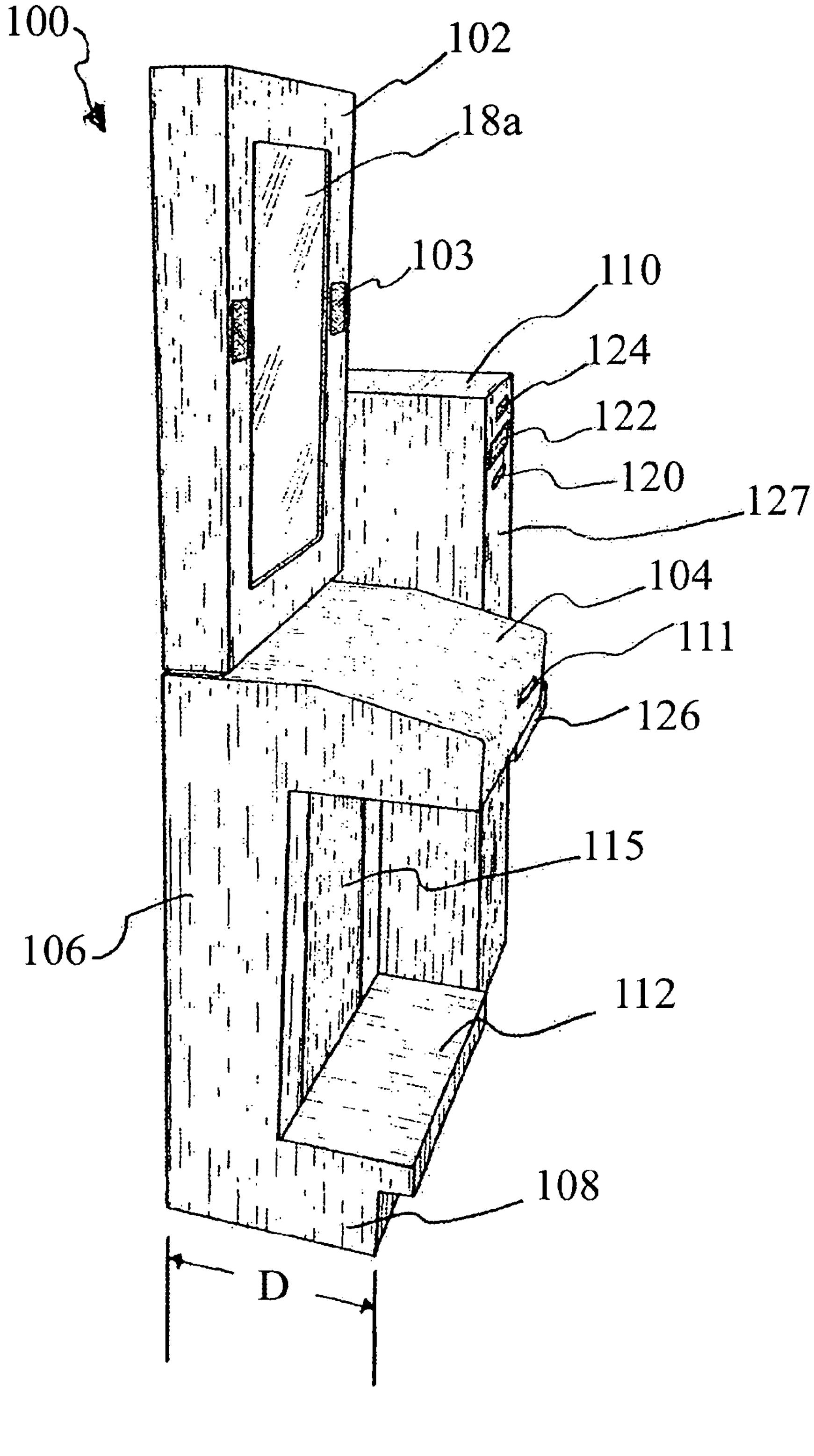
FIG. 8 is a perspective view of a gaming machine in accordance with a second embodiment of the present invention.
Figure 9:
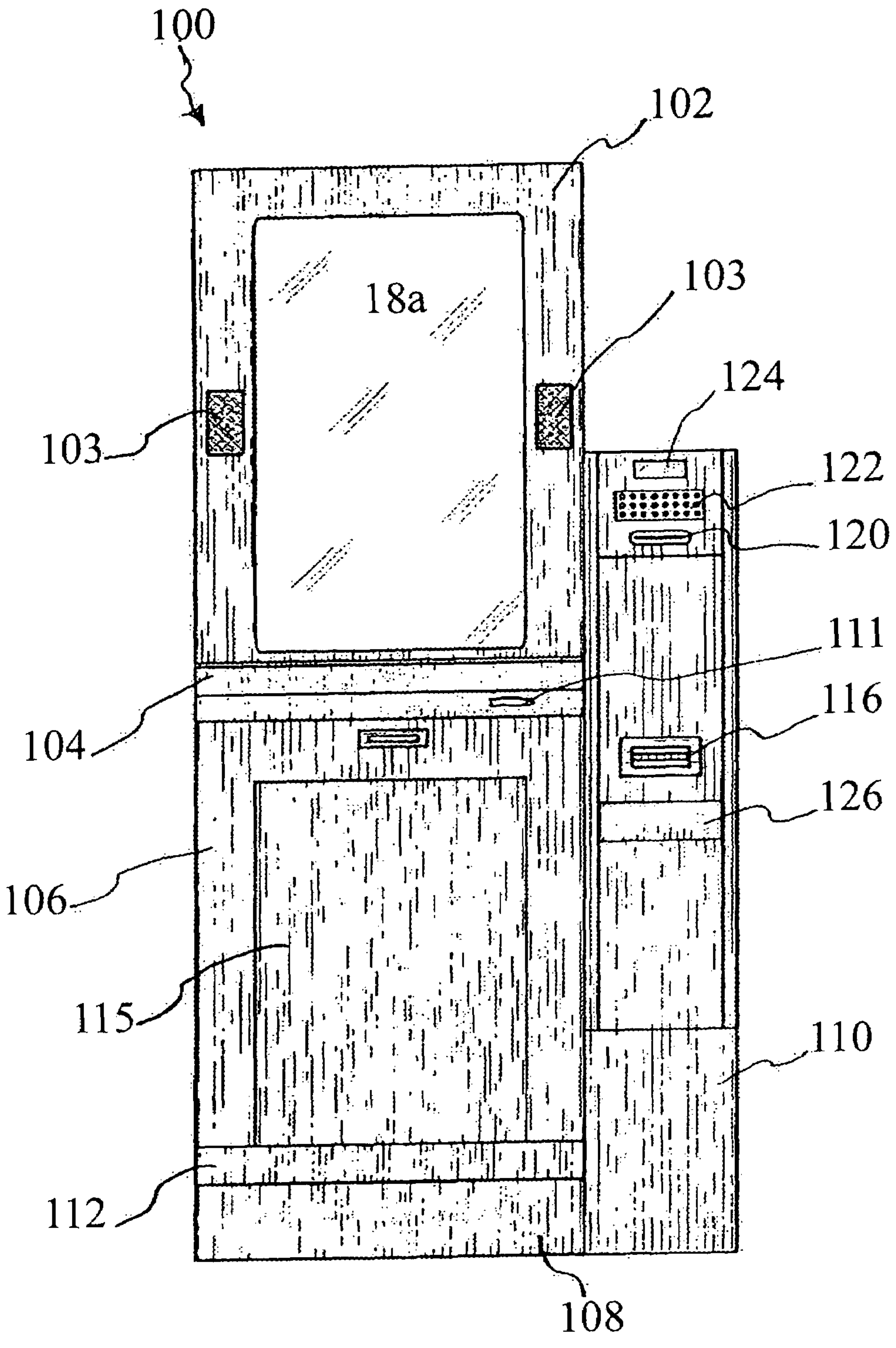
FIG. 9 is a front elevational view of the gaming machine of FIG. 8.

FIGS. 8-9 show a second embodiment of an ergonomic gaming machine 100. The machine 100 includes a display housing 102, a desk 104, an intermediate portion 106, a bottom portion 108 and a tower 110. The display housing 102 preferably includes a touch screen display 18*a* similar to the one described above with respect to the first embodiment 10, a monitor or monitors 18*b*, 18*c* and associated speakers 103. The intermediate portion 106 extends upwardly from the bottom portion 108 and has the display housing 102 extending upwardly therefrom and the desk 104 extending outwardly from near the top thereof, as shown in FIG. 8.

Figure 10:
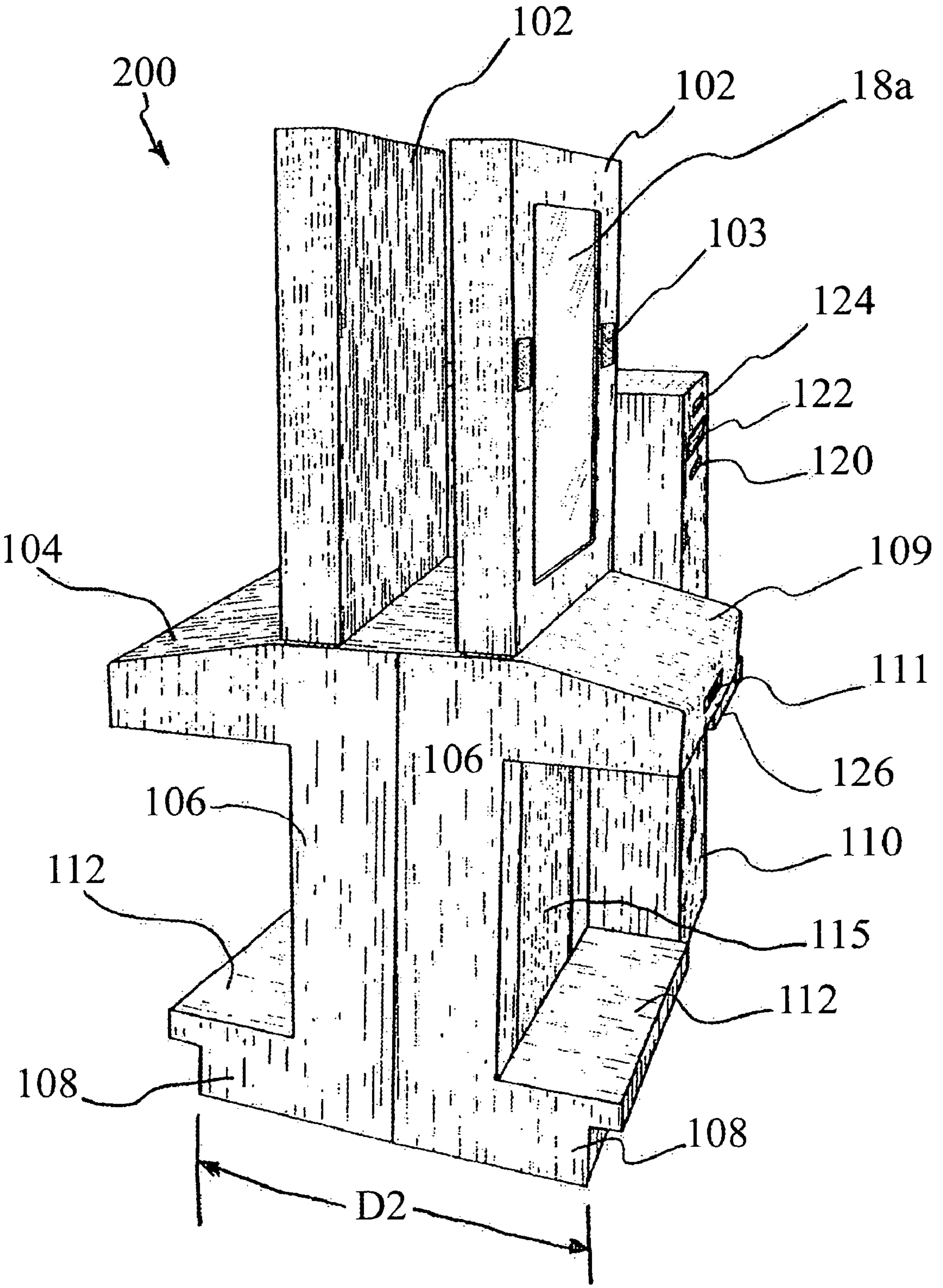
FIG. 10 is a perspective view of a gaming machine in accordance with a third embodiment of the present invention.
Figure 11:
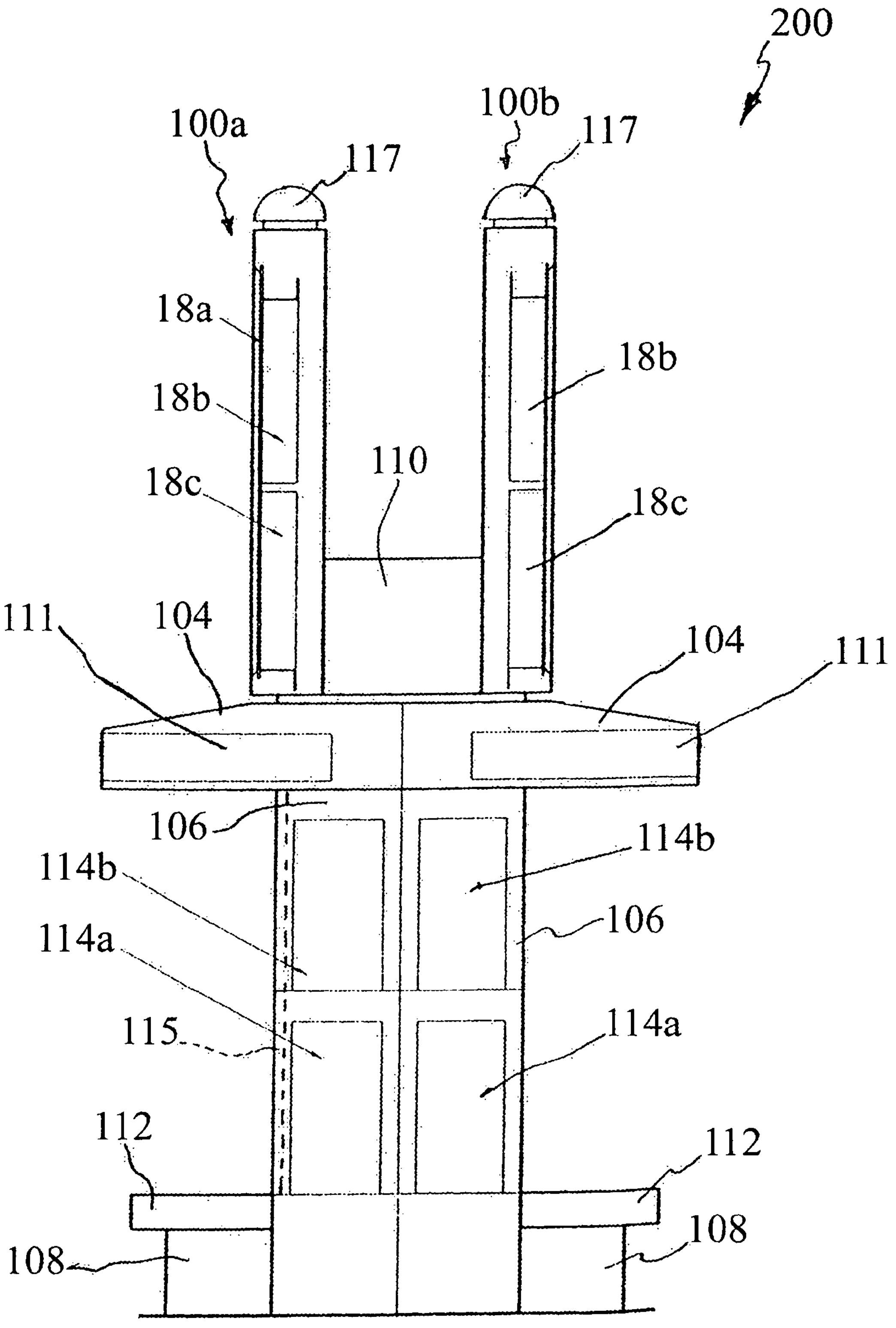
FIG. 11 is a side elevational schematic view of the gaming machine of FIG. 10 showing the interior components of the main body portion.
Figure 12:
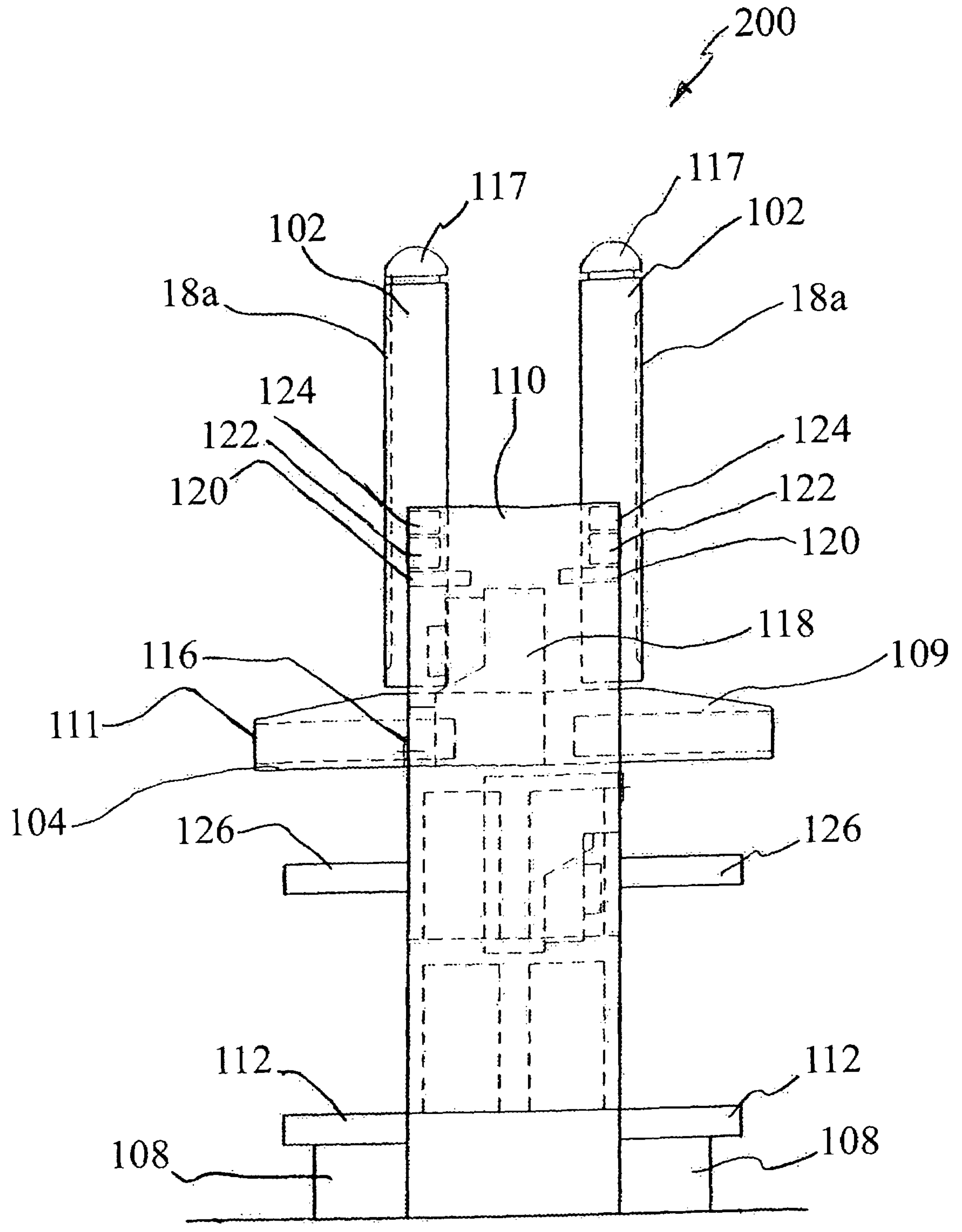
FIG. 12 is a side elevational schematic view of the gaming machine of FIG. 10 showing the interior components of the tower.

FIGS. 10-12 show a third embodiment of the present invention 200. In this embodiment, the gaming machine 200 includes two units 100*a* and 100*b* similar to machine 100 back to back that share a common tower 110. The two units 100*a* and 100*b* may be a single component (i.e., share a common housing), or the two may be separate components that are back to back, but are in electrical communication with the same tower 110. The components of the machines 100, 200 will be described below with reference to the figures showing the third embodiment 200.

The desk 104 preferably includes a ticket printer 111 for printing tickets when a user wins. Ticket printers 111 are known in the art. For example, the ticket printer 111 can be a ticket printer manufactured by Seiko Instruments. The ticket printer 111 is in electrical communication with a central processing unit (CPU) 114 (described below), which controls the number of tickets that are to be printed out as a result of a certain action. The bottom portion 108 preferably includes a footrest 112 extending outwardly therefrom in the same direction as the desk 104. In a preferred embodiment, the tower 110 is attached to one side 106*a* of the intermediate portion 106, the bottom portion 108 and the display housing 102.

In a preferred embodiment the components of the housing of the machine 100 (e.g., the display housing 102, desk 104, intermediate portion 106, bottom portion 108 and tower 110) are made of a rigid metal such as stainless steel or aluminum. However, this is not a limitation on the present invention.

As shown in FIG. 11, the intermediate portion 106 preferably houses the CPU 114. Access to the CPU 114 is granted by and an access door 115. The CPU 114 is in electrical communication with the touch screen display 18*a* and monitors 18*b*, 18*c*. The machine 100 (and the CPU 114) can be a stand alone unit, or it may be networked with other machines 100. The CPU 114 can also be operated as multiple processors that perform different functions. For example, in a preferred embodiment, the intermediate portion 106 contains two CPU's 114*a*, 114*b*, one for performing functions related to gaming, and one for performing functions relating to the non-gaming functions, such as ordering food and drinks. Accordingly, as described above, the display housing 102 can also house two separate monitors 18*b*, 18*c* for displaying information related to the individual CPU's 114*a*, 114*b*. The display housing 102 can also include a light bulb 117 or bulbs, such as flashing bulbs for indicating when a user has won. The bulb is electrically communicated with the CPU 114.

Preferably the tower 110 is thin and tall. For example, the tower height preferably ranges between about 30 inches and about 66 inches; more preferably between about 36 inches and about 60 inches; and most preferably ranges between about 42 inches and about 54 inches. The tower width preferably ranges between about 4 inches and about 12 inches; more preferably between about 6 inches and about 10 inches; and most preferably is about 8 inches. This, as described below, saves space. As shown in FIG. 12, the tower includes most of the electronic components of the machine 100, such as a bill acceptor 116 (and the associated drop box 118), a club card acceptor 120 (many casinos have club cards), a message delivery keypad 122, a display screen 124 for keypad entries and club card information. All of these components are in electrical communication with the CPU 114.

The tower 110 also preferably includes a shelf 126 on the front thereof and a main door 127 for access to the internal components. The door 127 preferably includes a lock and is hinged to the tower 110. It will be understood that the doors 115, 127 can be any component that blocks access to the interior components when shut. The bill acceptor 116 and club card acceptor 120 can be any type of acceptor known in the art. For example, the bill acceptor 116 can be a bill acceptor manufactured by JCM-American, and the club card acceptor/reader 120 can be a club card reader manufactured by American Magnetics. The display screen 124 is preferably a digital display screen. In alternative embodiments all of these components can be housed in the display housing 102, an intermediate portion 106 or a bottom portion 108. In another embodiment the ticket printer can be located on the tower 110.

Gaming machines 100 and 200 require less floor space than prior gaming machines presently in use. Because the machines are coinless and do not require large drop boxes, and because the machines operate electronically and do not require moving mechanical parts, the depth D, D2 (shown in FIG. 8) of the machines 100 and 200 is less than gaming machines presently in use. Preferably D ranges between about 8 inches and about 18 inches; more preferably D ranges between about 10 inches and about 16 inches; and most preferably D ranges between about 12 inches and about 14 inches. These ranges are doubled for the depth D2 of machine 200.

The embodiments of the present invention recited herein are intended to be merely exemplary and those skilled in the art will be able to make numerous modifications to them without departing from the spirit of the present invention. All such modifications are intended to be within the scope of the present invention as defined by the claims appended hereto.

What is claimed is:

1. A gaming machine comprising:

(a) a bottom portion;

(b) an intermediate portion extending upwardly from the bottom portion, wherein the intermediate portion houses at least two central processing units, and wherein the intermediate portion has opposite sides;

(c) two desks extending from the intermediate portion in opposite directions, wherein each desk includes at least one ticket printer in electrical communication with a different one of the central processing units;

(d) first and second separate spaced apart display housings extending upwardly from the intermediate portion, wherein the first and second display housings each house at least one touch screen display in electrical communication with a different one of the central processing units and the touch screens on the first and second display housings face in opposite directions; and (e) a tower affixed to one of the sides of the intermediate portion, the tower having a first side that faces the same direction as the screen side of the first display housing and a second side that faces the same direction as the screen side of the second display housing, wherein the tower includes at least two bill acceptors one on the first side and the other on the second side of the tower.

* * * * *